United States Patent [19]

Arnold et al.

[11] 4,022,828

[45] May 10, 1977

[54] VULCANIZATION INHIBITING COMPOUNDS

[75] Inventors: Robert J. Arnold, Evanston; Marion J. Gattuso, Hoffman Estates, both of Ill.

[73] Assignee: Universal Oil Products Company, Des Plaines, Ill.

[22] Filed: Mar. 25, 1974

[21] Appl. No.: 454,628

[52] U.S. Cl. .................. 260/545 R; 260/79.5 R; 260/556 A; 260/556 S

[51] Int. Cl.² ............ C07C 143/74; C07C 143/77; C07C 143/78; C07C 143/00

[58] Field of Search ........ 260/545 R, 556 A, 556 S

[56] References Cited

UNITED STATES PATENTS 3,671,503   6/1972   Schubart et al. ............... 260/79 S

*Primary Examiner*—Robert Gerstl

*Attorney, Agent, or Firm*—James R. Hoatson, Jr.; Raymond H. Nelson; William H. Page, II

[57] ABSTRACT

Novel compounds for inhibiting the premature vulcanization of vulcanizable rubber formulations comprising bis-(sulfonamido)-sulfides or polysulfides having the formula:

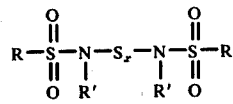

where R and R' are independently selected from the group consisting of aryl, alkyl, cycloalkyl or substituted derivatives thereof and $x$ is an integer of from 1 to 3. These novel compounds may be exemplified by bis-(N-methyl-p-toluenesulfonamido)-disulfide.

3 Claims, No Drawings

VULCANIZATION INHIBITING COMPOUNDS

BACKGROUND OF THE INVENTION

Rubber formulations, either synthetic or naturally occurring, must be processed in order to prepare finished products which are usable in industry. Among these processing features is the vulcanization of the rubber mixture by means well known in the art. In this respect various changes in the processing of rubber formulations have been adopted to facilitate the aforesaid processing, thereby improving the properties of the rubber products. Some of these changes, however, have resulted in a certain amount of premature vulcanization which is known in the trade as scorching and occurs prior to the desired vulcanization. Compounds may also be present in the rubber formulation which adversely effect the induction time or scorch duration period prior to vulcanization. For example, the rubber formulation may contain an antiozonant therein in order to impart protection to the finished rubber product against ozone cracking. Among the more popular antiozonants which are utilized for this purpose are the phenylenediamine type of compounds. However, this type of antiozonant appears to promote scorching or premature vulcanization. Another compound which may be present and which may have an adverse effect on the vulcanization period is a high pH furnace black which appears to lack the inherent inhibiting effect of the acidic channel blacks. In the past it has been a common practice to utilize certain compounds to reduce the risk of scorching prior to vulcanization. However, such compounds as the N-nitrosoamine type of retarders often are of limited effectiveness or adversely affect the vulcanization process and the quality of the final product.

In contrast to this it has now been found that novel compounds comprising bis-(sulfonamido)-sulfides or polysulfides of the formula:

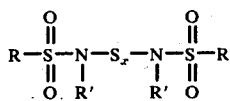

where R and R' are independently selected from the group consisting of aryl, alkyl, cycloalkyl or substituted derivatives thereof and $x$ is an integer of from 1 to 3 may be utilized as premature vulcanization inhibitors with increased effectiveness in rubber formulations, without adversely affecting the vulcanization process.

This invention relates to novel compounds comprising bis-(sulfonamido)-sulfides or polysulfides and more particularly to the use of these compounds as scorch inhibitors in the accelerated sulfur vulcanization of rubber formulations.

It is therefore an object of this invention to provide novel compounds of the type hereinafter set forth which may be used as scorch inhibitors.

A further object of this invention is to prepare novel compounds comprising bis-(sulfonamido)-sulfides or polysulfides.

In one aspect an embodiment of this invention resides in a compound having the formula:

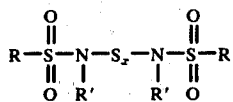

in which R and R' are independently selected from the group consisting of alkyl, cycloalkyl, phenyl and tolyl radicals, and $x$ is an integer of from 1 to 3.

Another embodiment of this invention is found in a vulcanizable rubber formulation containing, as an inhibitor against premature vulcanization thereof, a compound having the formula:

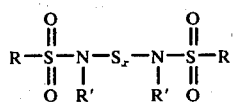

in which R and R' are independently selected from the group consisting of alkyl, cycloalkyl, phenyl and tolyl radicals, and $x$ is an integer of from 1 to 3.

A specific embodiment of this invention is found in a novel compound comprising bis-(N-methyl-p-toluenesulfonamido)-disulfide.

Another specific embodiment of this invention is found in a vulcanizable rubber formulation containing bis-(N-methyl-p-toluenesulfonamido)-disulfide.

Other objects and embodiments will be found in the following further detailed description of the present invention.

As hereinbefore set forth the present invention is concerned with novel compounds for inhibiting the scorch in the accelerated sulfur vulcanization of rubber, these compounds comprising bis-(sulfonamido)-sulfides or polysulfides. The novel compounds of the present invention may be prepared by reacting 2 moles of an appropriate substituted sulfonamide with 1 mole of any sulfur dichloride ($S_xCl_2$), in the presence of at least 2 moles of an acid scavenger. The reaction between the substituted sulfonamide and the sulfur dichloride is preferably effected at reduced temperatures ranging from about 0° up to about 10° C. In addition, the reaction is also effected at atmospheric pressure. However, if so desired, alternative reaction conditions of elevated temperatures and pressures may be employed, although not necessarily with equivalent results.

Examples of substituted sulfonamides which may be used as one of the starting materials of the present process will comprise compounds possessing the generic formula:

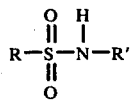

in which R and R' are independently selected from the group consisting of alkyl containing from 1 to about 6 carbon atoms, cycloalkyl containing from 3 to about 8 carbon atoms in the ring, phenyl and tolyl radicals. Representative examples of these compounds may be employed will include N-methyl-benzenesulfonamide, N-ethyl-benzenesulfonamide, N-butyl-benzenesulfonamide, N-pentyl-benzenesulfonamide, N-hexyl-benzenesulfonamide, N-methyl-o-toluenesulfonamide, N-ethyl-p-toluenesulfonamide, N-propyl-o-toluenesulfonamide, N-butyl-o-toluenesulfonamide, N-pentyl-o-toluenesulfonamide, N-hexyl-o-toluenesulfonamide, N-methyl-m-toluenesulfonamide, N-ethyl-m-toluenesulfonamide, N-propyl-m-toluenesulfonamide, N-butyl-m-toluenesulfonamide, N-pentyl-m-toluenesulfonamide, N-hexyl-m-toluenesulfonamide, N-methyl-p-toluenesulfonamide, N-ethyl-p-toluenesulfonamide, N-propyl-p-toluenesulfonamide, N-butyl-p-toluenesulfonamide, N-pentyl-p-toluenesulfonamide, N-hexyl-p-toluenesulfonamide, N-cyclopropyl-benzenesulfonamide, N-cyclobutyl-benzenesulfonamide, N-cyclopentyl-benzenesulfonamide, N-cyclohexyl-benzenesulfonamide, N-cycloheptyl-benzenesulfonamide, N-cyclooctyl-benzenesulfonamide, N-methyl-methanesulfonamide, N-methyl-ethanesulfonamide, N-methyl-propanesulfonamide, N-methyl-butanesulfonamide, N-methyl-pentanesulfonamide, N-methyl-hexanesulfonamide, N-phenyl-benzenesulfonamide, N-phenyl-o-toluenesulfonamide, N-phenyl-m-toluenesulfonamide, N-phenyl-p-toluenesulfonamide, etc. Examples of sulfur dichloride compounds which may be employed will possess the generic formula:

$$S_xCl_2$$

in which $x$ is an integer of from 1 to about 3. It is to be understood that the aforementioned compounds are only representative of the class of substituted sulfonamides, and that the present invention is not necessarily limited thereto.

As hereinbefore set forth the reaction between 2 moles of substituted sulfonamide and 1 mole of a sulfur dichloride is effected in the presence of at least 2 moles of an acid scavenger. In the preferred embodiment of the invention the acid scavengers will be basic in nature such as tertiary amines. Examples of these tertiary amines which may be employed will include trimethylamine, triethylamine, tri-n-propylamine, triisopropylamine, tri-n-butylamine, tri-t-butylamine, etc. If so desired, the reaction may also be effected in the presence of an organic solvent such as dimethylformamide, diethylformamide, dipropylformamide, benzene, toluene, n-heptane, n-hexane, cyclopentane, cyclohexane, etc.

The preparation of the novel compounds of the present invention may be effected in any suitable manner and may comprise either a batch or continuous type operation. For example, when a batch type operation is used, a quantity of the substituted sulfonamide may be dissolved in an appropriate solvent such as, for example, dimethylformamide, and thereafter cooled to reduced temperatures preferably from about 0° to about 5° C. utilizing any cooling means known in the art as, for example, an ice bath. In addition, the solution of substituted sulfonamide in the appropriate solvent also will contain the tertiary amine. Following this the appropriate sulfur dichloride compound is slowly added to the solution which, upon completion of the addition, is allowed to warm to room temperature. After reaching ambient temperature, the solution is thereafter added to ice water and the organic layer is separated from said water. Following this, the organic layer is then treated by conventional means such as solvent removal, washing, drying, crystallization, recrystallization, etc. whereby the desired product is separated and recovered.

It is also contemplated within the scope of this invention that the desired product may be obtained in a continuous manner of operation. When this type of operation is employed, the starting materials are charged to a reaction zone which is maintained at the proper operating conditions of temperature and, if so desired, pressure. In addition, the reaction zone may contain the tertiary amine and solvent or, if so desired, these compounds may be admixed with one or both of the starting materials prior to entry into said reaction zone and the resulting mixture charged thereto in a single stream. Upon completion of the desired reaction time, the effluent is continuously removed and subjected to separation and recovery means similar in nature to those hereinbefore set forth, whereby the desired product is recovered while any unreacted starting materials may, after further treatment, be recycled to the reaction zone to form a portion of the feed stock.

The novel compounds of the present invention which are prepared according to the above set forth processes will possess the generic formula:

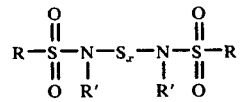

in which R and R' are independently selected from the group consisting of alkyl containing from 1 to about 6 carbon atoms, cycloalkyl containing from 3 to about 8 carbon atoms in the ring, phenyl and tolyl radicals, and $x$ is an integer of from 1 to 3. Some specific examples of these compounds will include bis-(N-methyl-benzensulfonamide)-disulfide, bis-(N-ethyl-benzenesulfonamido)-disulfide, bis-(N-propyl-benzenesulfonamido)-disulfide, bis-(N-butyl-benzenesulfonamido)-dislufide, bis-(N-pentyl-benzenesulfonamido)-disulfide, bis-(N-hexyl-benzenesulfonamido)-disulfide, bis-(N-methyl-p-toluenesulfonamido)-disulfide, bis-(N-ethyl-p-toluenesulfonamido)-disulfide, bis-(N-propyl-p-toluenesulfonamido)-disulfide, bis-(N-butyl-p-toluenesulfonamido)-disulfide, bis-(N-pentyl-p-toluenesulfonamido)-disulfide, bis-(N-hexyl-p-toluenesulfonamido)-disulfide, bis-(N-methyl-m-toluenesulfonamido)-disulfide, bis-(N-ethyl-m-toluenesulfonamido)-disulfide, bis-(N-propyl-m-toluenesulfonamido)-disulfide, bis-(N-butyl-m-toluenesulfonamido)-disulfide, bis-(N-pentyl-m-toluenesulfonamido)-disulfide, bis-(N-hexyl-m-toluenesulfonamido)-disulfide, bis-(N-cyclohexyl-methanesulfonamido)-disulfide, bis-(N-cyclohexyl-ethanesulfonamido)-disulfide, bis-(N-cyclohexyl-butanesulfonamido)-disulfide, bis-(N-cyclopropyl-p-toluenesulfonamido)-disulfide, bis-(N-cyclopentyl-p-toluenesulfonamido)-disulfide, bis-(N-cyclohexyl-p-toluenesulfonamido)-disulfide, bis-(N-methyl-ethanesulfonamido)-disulfide, bis-(N-methyl-propanesulfonamido)-disulfide, bis-(N-methyl-butanesulfonamido)-disulfide, bis-(N-methyl-benzenesulfonamido)-sulfide, bis-(N-propyl-benzenesulfonamido)-sulfide, bis-(N-pentyl-benzenesulfonamido)-sulfide, bis-(N-methyl-p-toluenesulfonamido)-sulfide, bis-(N-propyl-p-toluenesulfonamido)-sulfide, bis-(N-pentyl-p-toluenesulfonamido)-sulfide, bis-N-methyl-m-toluenesulfonamido)-sulfide, bis-(N-propyl-m-toluenesulfonamido)-sulfide, bis-(N-pentyl-m-toluenesulfonamido)-sulfide, bis-(N-cyclohexyl-methanesulfonamido)-sulfide, bis-(N-cyclohexyl-butanesulfonamido)-sulfide, bis-(N-cyclopentyl-p-toluenesulfonamido)-sulfide, bis-(N-methyl-ethanesulfonamido)-sulfide, bis-(N-methyl-butanesulfonamido)-suflide, bis-(N-methyl-benzenesulfonamido)-trisulfide, bis-(N-ethyl-benzenesulfonamido)-trisulfide, bis-(N-butylbenzenesulfonamido)-trisulfide, bis-(N-methyl-p-toluenesulfonamido)-trisulfide, bis-(N-hexyl-p-toluenesulfonamido)-trisulfide, bis-(N-cyclohexyl-methanesulfonamido)-trisulfide, bis-(N-cyclopentyl-p-toluenesulfonamido)-trisulfide, bis-(N-cyclooctyl-butanesulfonamido)-trisulfide, bis-(N-pentyl-cyclohexanesulfonamido)-trisulfide, etc. It is to be understood that the aforementioned compounds are only representative of the class of novel compounds which may be prepared, and that the present invention is not necessarily limited thereto.

The aforementioned bis-(sulfonamido)-sulfides and polysulfides are used as inhibitors in rubber formulations in any suitable concentration, said concentration varying with the particular rubber formulation. In the preferred embodiment of the invention the concentration may be within a range of from about 0.1 to about 5 and more specifically in a range of from about 0.1 to about 2 phr (pats per hundred parts by weight of rubber hydrocarbon).

As was previously set forth, these compounds are used in any vulcanizable rubber formulation, either synthetic or naturally occurring, in order to inhibit premature vulcanization. Some illustrative examples of the rubber formulations would include natural ruber, Buna S, SBR (styrene-butadiene), polymers of butadiene or copolymers thereof with other monomers such as, for example, acrylonitrile, isobutylene, methyl methacrylate, cis-4-polybutadiene, butyl rubber, ethylene propylene terpolymers, etc.

As was previously discussed, in order to protect the finished rubber product against cracking due to ozone, an antiozonant generally is incorporated in the rubber formulation. Any suitable antiozonant may be used and, in one embodiment, is of te p-phenylenediamine type. This type of compound will include, for example, N,N'-di-sec-alkyl-p-phenylenediamines, in which each alkyl substituent contains from 3 to 12 carbon atoms, and N-phenyl-N'-sec-alkyl-p-phenylenediamines, in which the alkyl substituent contains from 3 to 12 carbon atoms, N,N'-dicyclohexyl-p-phenylenediamines, N-phenyl-N'-cyclohexyl-p-phenylenediamine, etc. In another embodiment, the rubber formulation may include antiozonants which are of the aminophenyl types and include alkyl-substituted aminophenols in which the alkyl substituent on the nitrogen atom will contain from 3 to 20 carbon atoms or cycloalkyl-substituted p-aminophenyls in which the cycloalkkyl substituent on the nitrogen atom will contain from 3 to 12 carbon atoms in the ring. In most rubber formulations the antiozonant may be present in a concentration of from about 1 to about 5 parts by weight per hundred parts of rubber hydrocarbon in the formulation.

In addition to the antiozonant the rubber formulation will generally include a vulcanization accelerator. Any suitable vulcanizing accelerator may be used including the conventional types such as 2-mercaptobenzothiazole, N-cyclohexyl-2-benzothiazole sulfenamide, N-tert-butyl-2-benzothiazole sulfenamide, 2-(morpholinothio)-benzothiazole, N-phenyl-2-benzothiazole sulfenamide, amine salts of mercaptobenzothiazole accelerators, etc. Other accelerators include tetramethylthiuram disulfide, thiocarbamyl sulfenamides, thioureas, thioureas, xanthates, guanidien derivaties, etc. The vulcanizing accelerator will be used in conventional concentrations in the rubber formulation and may be within the range of from about 0.4 to about 3.0 parts by weight per hundred parts of rubber hydrocarbon in the formulation. It is understood that smaller or larger concentrations may be used when desired.

As hereinbefore set forth the compounds of the present invention are also present in the rubber formulation in order to retard or inhibit the scorch in the accelerated sulfur vulcanization of the rubber formulation when said vulcanization is carried out at the usual temperature which may range from about 120° to about 170° C. or more. By utilizing these compounds as will hereinafter be shown in greater detail in the appended examples, it is possible to retard the scorch in the acclerated sulfur vulcanization of rubber thus preventing any undesirable premature vulcanization which may lead to the preparation of finished rubber products which do not possess desirable characteristics.

The following examples are used to illustrate the novel compounds of the present invention and also to their use as prevulcanization inhibitors. However, these examples are not intended to limit the generally broad scope of the present invention in strict accordance therewith.

EXAMPLE I

A mixture comprising 18.5 grams (0.1 mole) of N-methyl-p-toluenesulfonamide and 11.1 grams (0.11 mole) of triethylamine dissolved in 150 cc. of dimethylformaide was cooled to a temperature of about 0° C. by means of an ice bath. To the cooled solution 6.8 grams (0.05 mole) of sulfur monochloride was slowly added dropwise. A white precipitate formed and remained during the addition of the sulfur monochloride. Upon completion of the addition of the sulfur monochloride, the mixturewas allowed to warm to ambient temperature and after reaching ambient temperature was thereafter poured into 200 grams of ice water. A yellow precipitate formed which was isolated by decanting off the liquid phase. The solid was taken up in ether, the solution was then dried over magnesium sulfate and the ether solvent was stripped under vacuum to afford a yellow oil which crystallized upon standing. The crystalline solid was recrystallized from methyl alcohol to give a white solid having a melting point of from 95° to 97° C., said crystals being bis-(N-methyl-p-toluenesulfonamido)-disulfide. The crystals were subjected to elemental analysis with the following results:

Anal. Calculated for: $C_{16}H_{28}N_2O_4S_4$: C, 44.42%, H, 4,66%, N, 6.48%; Found: C, 44.05%; H, 4,87%; N, 7.01%.

EXAMPLE II

A solution consisting of 37.0 grams (0.2 mole) of N-methyl-p-toluenesulfonamide and 22 grams (0.22 mole) of triethylamine in 150 cc. of dimethylformamide was cooled to a temperature of 0° C. by means of an ice bath. Following this 10.3 grams (0.1 mole) of sulfur dichloride was slowly added dropwise while maintaining the temperature of the solution in a range of from 0° to 10° C. During the addition of sulfur dichloride, the mixture turned a pale orange color with the concomitant formation of a white precipitate. Upon completion of the addition of the sulfur dichloride, the mixture was stirred for a period of 0.5 hours while maintaining the temperature in a range of from 0° to 5° C. Following this, the mixture was allowed to warm to room temperature. The solution, after reaching room temperature, was then slowly poured into 255 cc. of stirred ice water. An amber oil separated and was taken up in ether. The ether solution was washed twice with water, dried over magnesium sulfate and the ether was stripped in a vacuum. The amber oil which remained was subjected to benzene addition with the formation of dense colorless crystals. The crystals were recovered and recrystallized from additional benzene until a constant melting point of 121° to 123° C. was reached. The crystals which comprised bis-(N-methyl-p-toluenesulfonamido)-sulfide was subjected to analysis with the following results:

Anal. Calculated for: $C_{16}H_{20}N_2O_4S_3$: C, 47.98%; H, 5.03%; N, 6.99%; S, 24.02%; Found: C, 48.11%; H, 5.15%; N, 7.97%; S, 23.10%.

EXAMPLE III

In this example a solution comprising 48.2 grams (0.2 mole) of N-hexyl-benzenesulfonamide and 22 grams (0.22 mole) of triethylamine are placed in 150 cc. of benzene. The solution is then cooled to a temperature of 0° C. and maintained thereat while 13.6 grams (0.1 mole) of sulfur monochloride is slowly added thereto. Upon completion of the addition of the sulfur monochloride, the solution is then allowed to warm to room temperature and thereafter is slowly poured into 250 cc. of stirred ice water. The organic layer is separated, washed with water, dried over magnesium sulfate and concentrated under vacuum. The crystals which precipitate upon standing are recrystallized from a benzene solvent, said crystals comprising bis-(N-hexyl-benzenesulfonamido)-disulfide.

EXAMPLE IV

A solution comprising 43.4 grams (0.2 mole) of N-cyclohexyl-butanesulfonamide along with 22 grams (0.22 mole) of triethylamine in 150 cc. of toluene is cooled to a temperature of 0° C. by means of an ice bath. Following this 13.6 grams (0.1 mole) of sulfur monochloride is added dropwise to the solution while maintaining said solution at a temperature in the range of from 0° to 10° C. Upon completion of the addition of the sulfur monochloride, he solution is stirred for an additional 0.5 hours at a temperature in the range of from 0° to 5° C. At the end of this time, the solution is allowed to return to room temperature and thereafter is slowly poured into 250 cc. of stirred ice water. The organic layer is washed with water, dried over magnesium sulfate and the solvent is stripped therefrom to afford a viscous yellow oil, said oil comprising bis-(N-cyclohexyl-butanesulfonamido)-disulfide.

EXAMPLE V

To a solution of 25.5 grams (0.1 mole) of N-cyclohexyl-p-toluenesulfonamide and 6.5 grams (0.11 mole) of trimethylamine in 150 cc. of dimethylformamide is slowly added 5.1 grams (0.05 mole) of sulfur dichloride, the addition of the sulfure dichloride being made while maintaining the temperature of the solution in a range of from 0° to 5° C. Upon completion of the addition of the sulfur dichloride, the mixture is stirred for an additional period of 0.5 hours while maintaining the solution in the aforesaid temperature range. At the end of the stirring time, the mixture is allowed to return to room temperature and thereafter slowly poured into 250 cc. of stirred ice water. The oil phase of the mixture then extracted with ether after which the ether extract is washed with water, dried over magnesium sulfte and the ether solvent is stripped therefrom. The crystals which result upon standing are recrystallized from benzene until a constant melting point is reached, said crystals comprising bis-(n-cyclohexyl-p-toluenesulfonamido)-sulfide.

EXAMPLE VI

To illustrate the ability of the novel compounds of the present invention to act as scorch inhibitors in acclerated vulcanization of rubber the scorch properties of a rubber formulation were determined with a large rotor Mooney Viscometer at 250° F. (ASTM D-1077-55T). The values represent the number of minutes for a rubber containing a curing agent to increase in viscosity by 1 and they by 10 points. This method simulates conditions encountered during milling and subsequent vulcanization. A long scorch time indicates a high resistance to scorching. A rubber formulation was prepared according to the following recipe:

| Ingredient | Parts by Weight |
|---|---|
| SBR 1502 | 100.00 |
| Furnace Black | 40.00 |
| Oil Extender | 10.00 |
| Zinc Oxide | 3.00 |
| Stearic Acid | 2.00 |
| Sulfur | 2.00 |
| Antiozonant | 2.00 |
| Inhibitor | 0.50–1.00 |

The above ingredients were incorporated by conventional milling procedures and the formulations were cured in the Mooney Viscometer.

The results of these evaluations are reported in the following table along with a control run which was made without the use of the scorch inhibitor. This is reported as Run A. In Rub B the rubber formulationn contained 0.50 parts by weight of bis-(N-methyl-p-toluenesulfonamido)-sulfide. Run C contained 1.00 parts by weight of bis-(N-methyl-p-toluenesulfonamido)-sulfide. Run D contained 0.50 parts by weight of bis-(N-methyl-p-toluenesulfonamido)-disulfide, while Run E contained 1.00 parts by weight of bis-(N-methyl-p-toluenesulfonamido)-disulfide.

| Run | Mooney Scorch Data | | | % Increase in 1 Pt Rise |
|---|---|---|---|---|
| | 1 Pt Rise (Min.) | 10 Pt Rise (Min.) | Δ10–1 (Min.) | |
| A | 5.6 | 6.8 | 1.2 | — |
| B | 10.5 | 11.8 | 1.3 | 87.5 |
| C | 11.9 | 13.6 | 1.7 | 113.0 |
| D | 6.0 | 7.3 | 1.3 | 7.1 |
| E | 7.9 | 9.1 | 1.2 | 42.7 |

It is to be noted from the above table that the rubber formulations which contained the scorch inhibitors of the present invention exhibited a percentage of increase in the 1 point rise time, said percentage increase ranging from 7.1% in Run D to 113% increase in the case of Run C. This definitely proves that the sulfides or disulfides containing substituted sulfonamide substituents inhibit the premature vulcanization of the rubber formulation.

EXAMPLE VII

When other compounds such as bis-(N-hexyl-benzenesulfonamido)-disulfide, bis-(N-cyclohexyl-butanesulfonamido)-disulfide, and bis-(N-cyclohexyl-p-toluenesulfonamido)-sulfide are admixed with similar rubber formulations, it will be found that the premature vulcanization of the rubber formulation will also be inhibited in like manner.

We claim as our invention:

1. A compound having the formula:

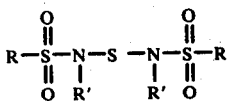

in which R and R' are independently selected from the group consisting of alkyl of from 1 to about 6 carbon atoms, cycloalkyl having from 3 to about 8 carbon atoms in the ring, phenyl and tolyl radicals.

2. The compound of claim 1 being bis-(N-methyl-p-toluenesulfonamido)-sulfide.

3. The compound of claim 1 being bis-(N-cyclohexyl-p-toluenesulfonamido)-sulfide.

* * * * *